Oct. 24, 1967  G. SCHAEFFLER ET AL  3,348,889
SEALED NEEDLE BEARING

Filed Aug. 3, 1964

INVENTORS
GEORG SCHAEFFLER
RUDOLF JAHN

BY

Hammond & Littell

ATTORNEYS

Oct. 24, 1967    G. SCHAEFFLER ET AL    3,348,889
SEALED NEEDLE BEARING

Filed Aug. 3, 1964    2 Sheets-Sheet 2

Inventors
GEORG SCHAEFFLER
RUDOLF JAHR
BY
ATTORNEYS

United States Patent Office 3,348,889
Patented Oct. 24, 1967

3,348,889
SEALED NEEDLE BEARING
Georg Schaeffler and Rudolf Jahn, Nurnberg, Germany, assignors to Industriewerk Schaeffler, Herzogenaurach, Germany, a corporation of Germany
Filed Aug. 3, 1964, Ser. No. 387,036
Claims priority, application Germany, Aug. 13, 1963, J 24,242
6 Claims. (Cl. 308—187.2)

The invention relates to a novel sealed needle bearing having a thin-walled outer race produced without cutting with a radially-inwardly directed rim formed onto one end of the race without cutting and whose other end is flanged inwardly to form a rim after introduction of the bearing needles and/or needle cage.

The arrangement of sealing members in needle bearings is difficult since there is only a small amount of space available in the radial direction due to the small diameter of the rollers. Also, securing the sealing member precisely in thin-walled outer races formed without cutting is difficult, particularly if the axial space for the sealing members is to be kept as small as possible. One known sealing arrangement for needle bearings of this type comprises arranging elastic sealing discs between the formed-on rims of the race and the end rings of the needle cage in the race. However, these discs bear, with slight curvature, against the bore of the race and the surface of the shaft arranged in the bearing and it is not possible to ascertain before assembly of the bearing whether the sealing disc fits rigidly in the race or whether it rotates with the shaft since the sealing discs are fixed in the race in this construction. Moreover, since the sealing discs are not fixed in this construction, it is readily possible for the said disc to become wedged between the rotating shaft and the bore of the formed-on rims of the race during operation of the bearing and the disc may thus be destroyed. Another disadvantage of this arrangement is that the cage abuts directly at the end face against the sealing disc.

It is an object of the invention to provide a novel sealed needle bearing without additional machining of the race.

It is another object of the invention to provide a novel sealed needle bearing without a greatly increased axial length.

These and other objects and advantages of the invention will become obvious from the following detailed description.

The sealed needle bearing of the invention is comprised of a thin-walled outer race produced without cutting having on one end a radially-inwardly directed rim formed-on without cutting, an elastic sealing disc clamped against the said rim by a metal disc bearing at its periphery against the bore of the race under preload and bearing needles and/or cage, the outer edge of the race being flanged-over inwardly to form a rim.

The said sealed needle bearings are very simple to manufacture. The thin-walled outer races produced without cutting are formed by first using drawing operations to produce a cylindrical sleeve having a radially-inwardly directed rim formed on one end of the race without cutting and reduced wall thickness at the other end to provide a shoulder in its bore. Normally, after the introduction of the rollers and/or cage, the reduced end of the sleeve is inwardly flanged-over to provide a second rim.

To seal these needle bearings at one end according to the invention, a thin-walled, elastic sealing disc is inserted in the open end of the race and placed against the already formed-on rim. The metal disc is then inserted in the open end against the said sealing disc and bears under preload against the bore of the race to clamp the sealing disc between the metal disc and the rim. The fixing of the metal disc against the bore may be effected in any desired manner; i.e. by giving the metal disc a frusto-conical or arched cross-section and pressing it flat after introduction in the bore or by widening the metal disc by radical pressure after insertion in the bore or by pressing an originally oversized metal disc into the bore of the race.

It is also possible to seal the other end of the bearing which is flanged-over to form the second rim after the rollers and/or cage have been inserted in the race. A metal disc is inserted into the bore of the race and abuts against the shoulder in the race bore formed by reduction of the wall thickness. After placing an elastic sealing disc against the metal disc, the second rim is formed by flanging-over the end which firmly clamps the sealing disc between the metal disc and the subsequently formed-on rim.

No additional machining operations are required for either sealing arrangement and the only additional parts required are the metal discs and elastic sealing discs which may be made of rubber, synthetic plastic material or the like. The axial overall length of the needle bearing is increased at both ends with this sealing arrangement only by the amount resulting from the small thickness of the metal disc and the sealing disc.

When thin-walled metal races produced without cutting are being prepared by known methods, the formation of a sharp edge at the transition from the bore to the formed-on rim is not possible due to manufacturing techniques and there is always a rounding of the transition with a certain radius. To guarantee satisfactory fixing of the sealing arrangement in the race despite this rounding, the metal disc may be constructed so that it surrounds the outer periphery of the sealing disc by flanging-over the metal disc to give it a U-shape. This flanging-over provides a rounding at the periphery of the metal disc which is adapted to the rounding of the race when the sealing arrangement is mounted in the race.

Referring now to the drawings—

Figure 1:
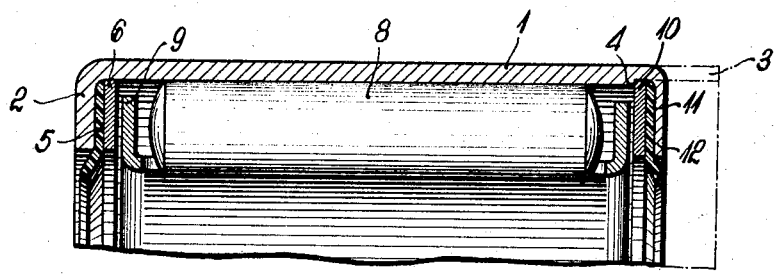
FIG. 1 is a fragmentary longitudinal sectional view through the outer race of one needle bearing embodiment of the invention.

In the embodiment of FIG. 1, the outer race 1 is drawn from sheet metal and provided at one end with a radially-inwardly directed rim 2 which is formed-on the race without cutting. At the opposite end 3 of the race, the wall thickness of the race is reduced to form a shoulder 4 in the bore of the race. An elastic sealing disc 5 bears against the rim 2 of the race and is held in position by the clamping action of metal disc 6 whose outer periphery bears under preload against the bore of race 1. Within the race 1, there are bearing needles 8 held and guided in an axially-parallel manner by a cage 9 in a known manner.

In the embodiment of FIG. 1, a sealing arrangement is also provided at the right-hand side of race 1. A metal disc 10 is inserted into the end 3 of the race 1 which is indicated in dot-dash lines and bears against the shoulder 4 produced by the reduction in the wall thickness of the race. An elastic sealing disc 11 is placed against the metal disc 10 and the reduced end 3 is flanged-over to form a radially-inwardly directed rim 12 whereby the sealing disc 11 is clamped firmly between the metal disc 10 and the rim 12.

Figure 3:
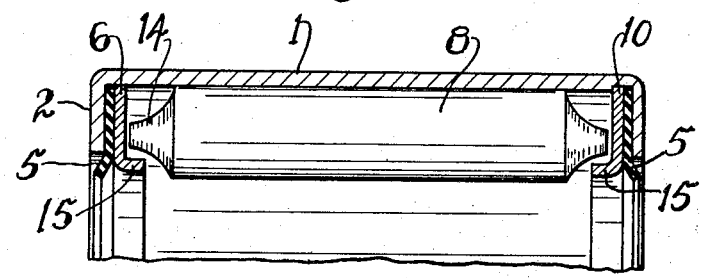
FIG. 3 is a fragmentary longitudinal sectional view through the outer race of another needle bearing embodiment of the invention.

Instead of having the bearing needle 8 arranged in a cage, the bearing needles may bear close against one another to obtain a contiguous-needle raceless bearing as in FIG. 3. In this type of bearing, the needles 8 are generally constructed with tapered ends 14 which are engaged over by flanges formed on the race ring to retain the needles in the ring. With such a bearing construction using the sealing arrangement of the invention, the bores of the metal discs 6 and 10 clamping the sealing discs 5 may be provided with flanges 15 directed towards the interior of the bearing to retain the needles in the race.

Figure 2:
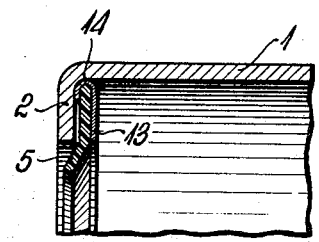
FIG. 2 is a fragmentary longitudinal sectional view of a modified embodiment of the invention.

In the modification of the bearing of FIG. 1 illustrated by FIG. 2, the sealing disc 5 is connected by a flanged-over part 14 to a metal disc 13 which is mounted under preload in the bore of the race 1. The rounding formed by the flange 14 matches the rounding between the bore of the race 1 and the rim 2. Other modifications of the embodiments are possible. The sealing discs 5 and 11 may be attached to the metal discs 5, 10 or 13 by vulcanization, gluing, etc. and/or the metal discs may be provided with angle-over portions in their bores so that they adjust the sealing discs to a specific angle to fix the sealing disc.

Various other modifications of the bearing of the invention may be made without departing from the spirit or scope thereof and it is to be understood that the invention is to be limited only as defined in the appended claims.

We claim:

1. A sealed needle bearing comprising a thin walled outer race drawn from sheet metal and a series of needle rollers therein, the outer race having on one end a radially-inwardly directed rim bent over the outer edge of the race with the inner surface of the race and the rim being continuous and smooth-walled, an elastic sealing disc clamped against the said rim by a metal disc on the inner side of the elastic sealing disc with the said metal disc bearing at its periphery against the bore of the race under preload and a second formed on rim at the other end of the race.

2. A sealed needle bearing comprising a thin walled outer race drawn from sheet metal and a series of needle rollers therein, the outer race having on one end a radially-inwardly directed rim bent over the outer edge of the race with the inner surface of the race and the rim being continuous and smooth-walled, an elastic sealing disc clamped against the said rim by a metal disc on the inner side of the elastic sealing disc with the said metal disc engaging over the outer periphery of the elastic sealing disc and bearing at its periphery against the bore of the race under preload and a second formed on rim at the other end of the race.

3. A sealed needle bearing comprising a thin walled outer race drawn from sheet metal and a series of needle rollers therein, the outer race having on one end a radially-inwardly directed rim bent over the outer edge of the race with the inner surface of the race and the rim being continuous and smooth-walled, and a shoulder formed in the bore of the other end by reduction of the wall thickness, an elastic sealing disc clamped against the radially-inwardly directed rim by a metal disc on the inner side of the elastic sealing disc with the said metal disc bearing at its periphery against the bore of the race under preload, a second metal disc bearing against the shoulder in the bore and an elastic sealing disc clamped against the second metal disc by the flanged-over end of the race having a reduced wall thickness.

4. A sealed needle bearing comprising a thin walled outer race drawn from sheet metal and a series of needle rollers bearing close against one another and having tapered ends, the outer race having on one end a radially-inwardly directed rim bent over the outer edge of the race with the inner surface of the race and the rim being continuous and smooth-walled and a shoulder formed in the bore of the other end of the race by reduction of the wall thickness, an elastic sealing disc clamped against the radially-inwardly directed rim by a metal disc on the inner side of the elastic sealing disc with the said metal disc bearing at its periphery against the bore of the race under preload, a second metal disc bearing against the shoulder in the bore and an elastic sealing disc clamped against the second metal disc by a bent-over end of said other end of the race, the bores of the metal discs having flanges directed towards the interior of the bearing which engage over the tapered ends of the needles to retain them in the race.

5. A sealed needle bearing comprising a thin walled outer race drawn from sheet metal and a series of needle rollers, the outer race having on one end a radially-inwardly directed rim bent over the outer edge of the race with the inner surface of the race and the rim being continuous and smooth-walled, and on the other end of the race a shoulder in the bore thereof formed by reduction of the wall thickness, a metal disc bearing against the said shoulder in the bore and an elastic sealing disc clamped against the metal disc by the flanged end of the race having a reduced wall thickness.

6. The bearing of claim 1 wherein the needles are held and guided by a cage.

References Cited

UNITED STATES PATENTS

| 1,256,136 | 2/1918 | Johnson | 308—186 X |
| 1,737,816 | 12/1929 | Webber | 308—186 X |
| 1,866,046 | 7/1932 | Lemieux | 308—187.1 X |
| 1,995,838 | 3/1935 | Buchwalter | 308—187.24 |
| 2,077,881 | 4/1937 | Gits | 308—187.1 X |
| 2,244,380 | 6/1941 | Warner | 64—17 |
| 2,274,137 | 2/1942 | Frauenthal | 308—187.2 |
| 2,281,010 | 4/1942 | Reynolds | 308—187.2 X |
| 2,427,449 | 9/1947 | Dunn | 308—187.2 X |
| 2,622,934 | 12/1952 | Phelps | 308—187.2 X |
| 2,712,460 | 7/1955 | Saywell | 277—94 |
| 2,718,441 | 9/1955 | Smith | 277—104 X |
| 2,829,933 | 4/1958 | Brusca | 308—194 |
| 2,856,246 | 10/1958 | Gaubatz | 308—187.2 |
| 2,887,331 | 5/1959 | Johnson | 277—182 |
| 2,896,432 | 7/1959 | Hempel | 64—17 |
| 3,003,835 | 10/1961 | Schindel | 308—187.2 |
| 3,241,846 | 3/1966 | Peickii | 308—187.1 X |

FOREIGN PATENTS

| 65,563 | 5/1951 | France. |
| 1,228,019 | 8/1960 | France. |
| 1,252,228 | 12/1960 | France. |
| 675,386 | 4/1939 | Germany. |

MARTIN P. SCHWADRON, *Primary Examiner.*

DAVID J. WILLIAMOWSKY, *Examiner.*

L. L. JOHNSON, *Assistant Examiner.*